United States Patent
Bittel et al.

(10) Patent No.: US 11,480,042 B2
(45) Date of Patent: Oct. 25, 2022

(54) THREE-PHASE SEPARATION OF HYDROCARBON CONTAINING FLUIDS

(71) Applicant: John Zink Company, LLC, Tulsa, OK (US)

(72) Inventors: Gene Bittel, Tulsa, OK (US); Errol Calvert, Tulsa, OK (US); Hai Lai, Tulsa, OK (US); Melissa Lenhart, Tulsa, OK (US); Brock Peoples, Tulsa, OK (US); Stephen Rehm, Tulsa, OK (US); Ahmed Sheikh, Tulsa, OK (US)

(73) Assignee: John Zink Company, LLC, Tulsa, OK (US)

( * ) Notice: Subject to any disclaimer, the term of this patent is extended or adjusted under 35 U.S.C. 154(b) by 68 days.

(21) Appl. No.: 16/881,029

(22) Filed: May 22, 2020

(65) Prior Publication Data
US 2020/0370407 A1     Nov. 26, 2020

Related U.S. Application Data

(60) Provisional application No. 62/852,704, filed on May 24, 2019.

(51) Int. Cl.
| | | |
|---|---|---|
| *E21B 43/34* | (2006.01) | |
| *B01D 17/04* | (2006.01) | |
| *C10G 33/08* | (2006.01) | |
| *B01D 19/00* | (2006.01) | |

(52) U.S. Cl.
CPC ............ *E21B 43/34* (2013.01); *B01D 17/042* (2013.01); *B01D 17/044* (2013.01); *B01D 19/0073* (2013.01); *C10G 33/08* (2013.01); *B01D 2221/04* (2013.01); *C10G 2300/1033* (2013.01)

(58) Field of Classification Search
CPC ......... E21B 43/34; E21B 21/06; B01D 17/02; B01D 17/042; B01D 17/044; B01D 17/12; B01D 19/0036; B01D 19/0073; B01D 2221/04; B01D 19/0068; B01D 17/04; C10G 33/00; C10G 33/08; C10G 2300/1033; C10G 53/02; C10G 5/06
See application file for complete search history.

(56) References Cited

U.S. PATENT DOCUMENTS

| | | | | |
|---|---|---|---|---|
| 3,541,763 | A * | 11/1970 | Heath | B01D 53/26 96/242 |
| 4,579,565 | A * | 4/1986 | Heath | E21B 43/34 96/201 |
| 9,828,556 | B1 * | 11/2017 | Rehm | C10G 7/00 |
| 10,184,090 | B2 * | 1/2019 | MaråK | C10L 3/08 |

OTHER PUBLICATIONS

Pennsylvania State University Petroleum Refining (https://www.e-education.psu.edu/fsc432) [hereinafter, Penn State U.] (Year: 2021).*

* cited by examiner

*Primary Examiner* — Gabriel E Gitman

(57) ABSTRACT

Systems and methods for separation of hydrocarbon containing fluids are provided. More particularly, the disclosure is relevant to separating fluids having a gas phase, a hydrocarbon liquid phase, and an aqueous liquid phase using indirect heating. In general, the system uses a first three-phase gas separation. The gas stream separated out is cooled with the resulting hydrocarbon condensates reintroduced to the stream of hydrocarbon-liquid phase that was separated from the fluid. The resulting combined stream can be cooled or heated as necessary.

16 Claims, 10 Drawing Sheets

COOLING TO 65° F OFF SALES GAS COOLER

| Stream Number | | | | | | | | Stored Oil Properties | | | | | | | DUTY (MMBtu/h) | | |
|---|---|---|---|---|---|---|---|---|---|---|---|---|---|---|---|---|---|
| 1 | 2 | 3 | 5 | 10 | 12 | 13 | | TVP | RVP | BP | Q | T | P | Liquid Vol Flow | Water Bath Heater | Sales Gas Cooler | Total Duty | |
| Temp(°F) | bbl/d | Temp(°F) | bbl/d | Temp(°F) | Temp(°F) | Temp(°F) | bbl/d | psia | psi | °F | | °F | psia | bbl/d | MMbtu/h | MMbtu/h | MMbtu/h | RT |
| 125 | 266 | 65 | 131.5 | 107 | 111.2 | 100 | 54.58 | 15.2 | 10.03 | 100 | 0 | 100 | 15.2 | 2668 | 0.1340 | 1.59 | 1.4560 | 121.333 |
| 130 | 289 | 65 | 154.5 | 110 | 111.1 | 100 | 53.42 | 15.2 | 10.03 | 100 | 0 | 100 | 00.0 | 2669 | 0.0647 | -1.80 | -1.7353 | -144.608 |
| 135 | 314 | 65 | 179 | 112 | 111.0 | 100 | 52.84 | 15.2 | 10.03 | 100 | 0 | 100 | 00.0 | 2670 | 0.0033 | -2.03 | -2.0267 | -168.892 |
| 140 | 339 | 65 | 204.9 | 115 | 111 | 100 | 52.77 | 15.2 | 10.03 | 100 | 0 | 100 | 00.0 | 2671 | -0.0506 | -2.27 | -2.3206 | -193.383 |
| 145 | 366 | 65 | 232.2 | 117 | 111 | 100 | 53.06 | 15.2 | 10.05 | 100 | 0 | 100 | 00.0 | 2672 | -0.099 | -2.53 | -2.6290 | -219.083 |
| 150 | 393 | 65 | 260.8 | 118 | 111 | 100 | 53.66 | 15.2 | 10.07 | 100 | 0 | 100 | 00.0 | 2673 | -0.142 | -2.81 | -2.9520 | -246 |
| 155 | 422 | 65 | 290.6 | 120 | 111.1 | 100 | 54.62 | 15.2 | 10.1 | 100 | 0 | 100 | 00.0 | 2674 | -0.179 | -3.11 | -3.2890 | -274.083 |
| 160 | 452 | 65 | 321.7 | 121 | 111.1 | 100 | 55.87 | 15.2 | 10.13 | 100 | 0 | 100 | 00.0 | 2675 | -0.211 | -3.42 | -3.6310 | -302.583 |
| 165 | 483 | 65 | 353.9 | 122 | 111.2 | 100 | 57.33 | 15.2 | 10.16 | 100 | 0 | 100 | 00.0 | 2676 | -0.238 | -3.76 | -3.9980 | -333.167 |
| 170 | 514 | 65 | 387.1 | 123 | 111.28 | 100 | 58.99 | 15.2 | 10.19 | 100 | 0 | 100 | 00.0 | 2677 | -0.26 | -4.12 | -4.3800 | -365 |
| 175 | 547 | 65 | 421.4 | 123 | 111.35 | 100 | 60.84 | 15.2 | 10.22 | 100 | 0 | 100 | 00.0 | 2677 | -0.278 | -4.5 | -4.7780 | -398.167 |
| 180 | 581 | 65 | 456.6 | 124 | 111.42 | 100 | 62.82 | 15.2 | 10.25 | 100 | 0 | 100 | 00.0 | 2678 | -0.291 | -4.91 | -5.2010 | -433.417 |
| 185 | 615 | 65 | 492.6 | 124 | 111.47 | 100 | 64.89 | 15.2 | 10.27 | 100 | 0 | 100 | 00.0 | 2678 | -0.301 | -5.36 | -5.6610 | -471.75 |
| 190 | 650 | 65 | 529.4 | 124 | 111.51 | 100 | 67.06 | 15.2 | 10.3 | 100 | 0 | 100 | 00.0 | 2679 | -0.306 | -5.83 | -6.1360 | -511.333 |
| 195 | 686 | 65 | 566.7 | 124 | 111.54 | 100 | 69.3 | 15.2 | 10.33 | 100 | 0 | 100 | 00.0 | 2679 | -0.307 | -6.34 | -6.6470 | -553.917 |
| 200 | 722 | 65 | 604.6 | 124 | 111.55 | 100 | 71.58 | 15.2 | 10.35 | 100 | 0 | 100 | 00.0 | 2679 | -0.305 | -6.9 | -7.2050 | -600.417 |
| 205 | 759 | 65 | 642.9 | 123 | 111.55 | 100 | 73.9 | 15.2 | 10.37 | 100 | 0 | 100 | 00.0 | 2679 | -0.299 | -7.5 | -7.7990 | -649.917 |
| 210 | 795 | 65 | 681.3 | 123 | 111.55 | 100 | 76.27 | 15.2 | 10.39 | 100 | 0 | 100 | 00.0 | 2679 | -0.288 | -8.15 | -8.4380 | -703.167 |
| 215 | 832 | 65 | 720 | 122 | 111.47 | 100 | 78.5 | 15.2 | 10.41 | 100 | 0 | 100 | 00.0 | 2679 | -0.276 | -8.86 | -9.1360 | -761.333 |
| 220 | 869 | 65 | 758.6 | 121 | 111.41 | 100 | 80.8 | 15.2 | 10.42 | 100 | 0 | 100 | 00.0 | 2679 | -0.258 | -9.63 | -9.8880 | -824 |

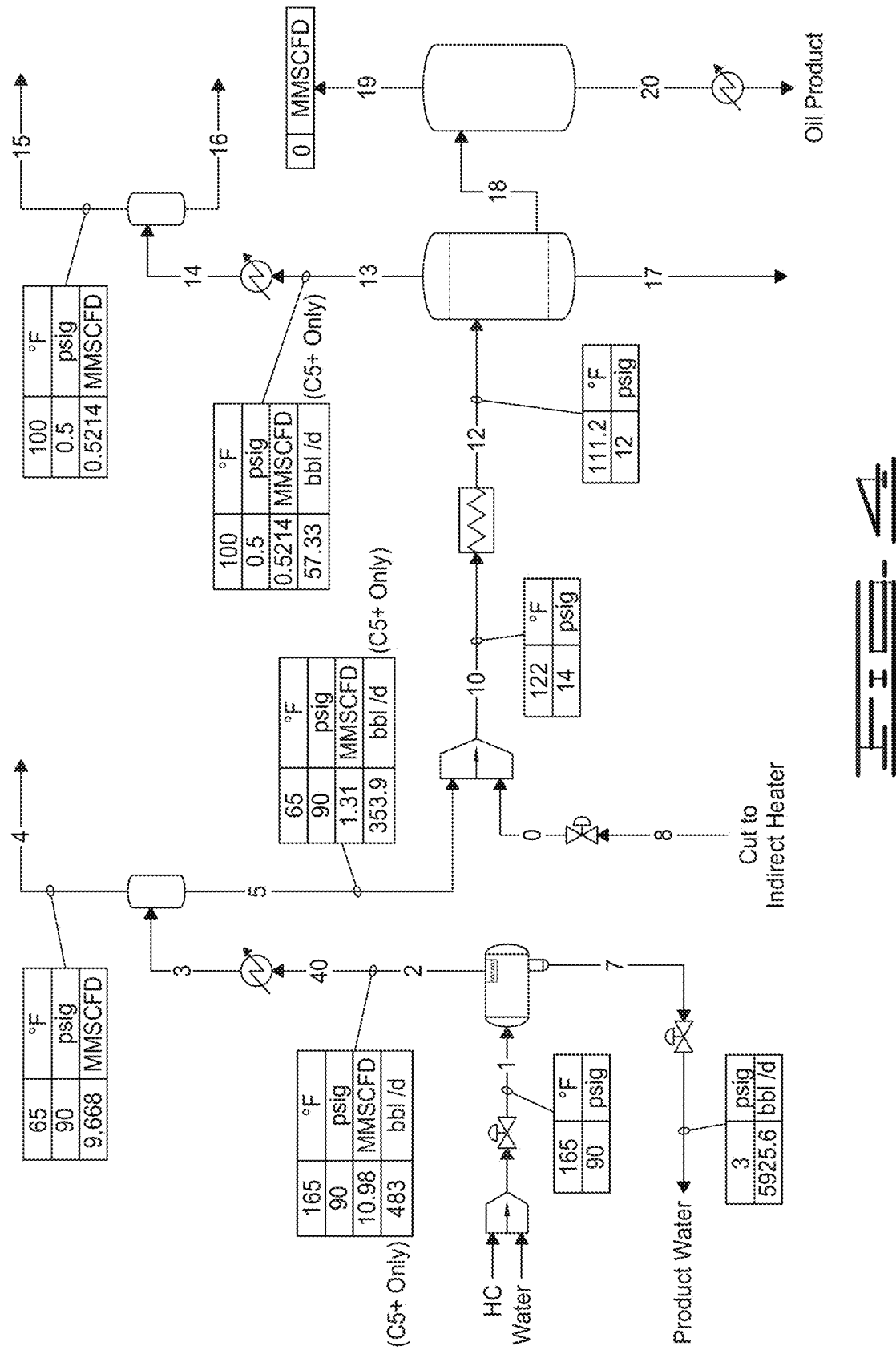

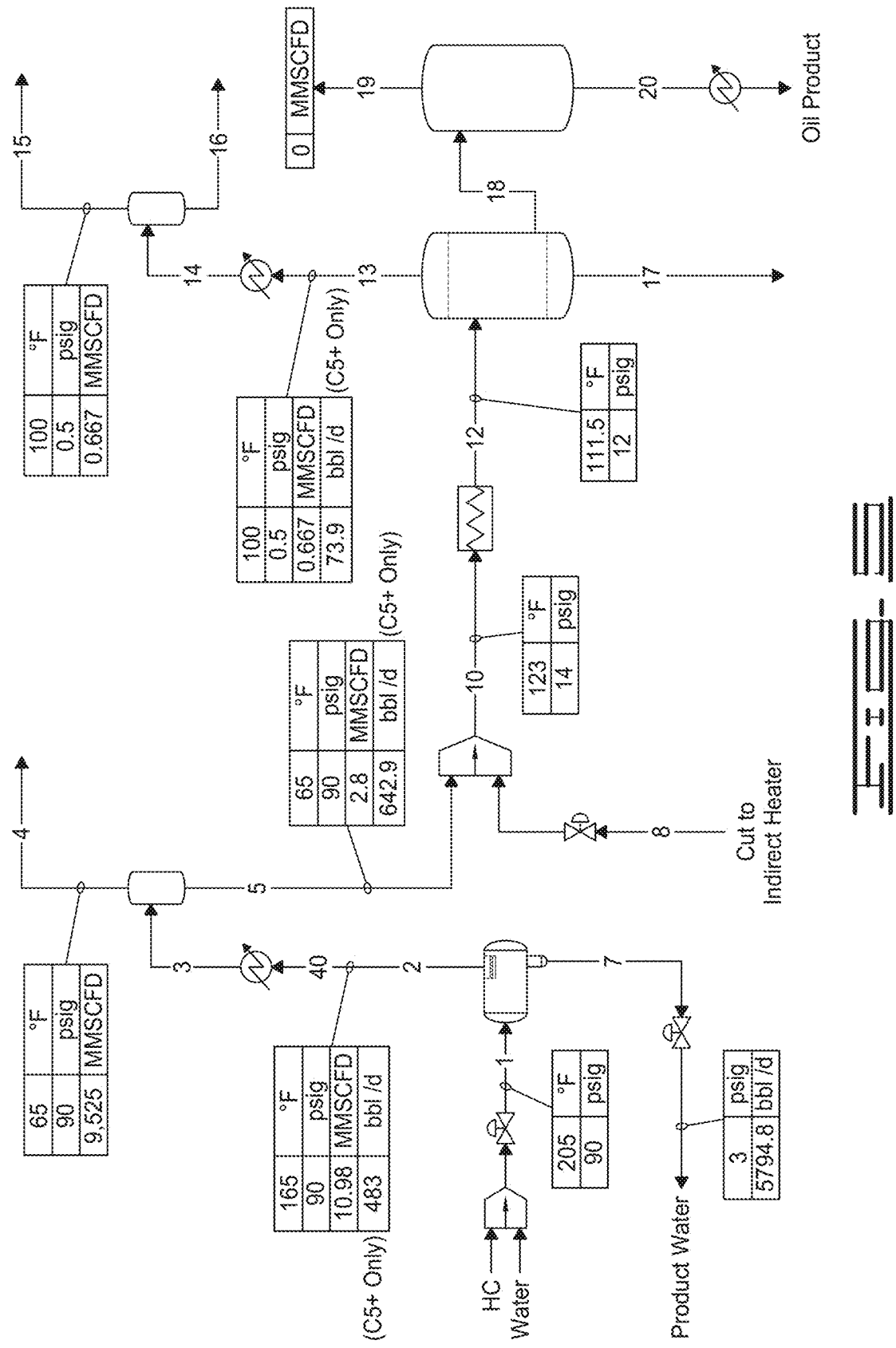

COOLING TO 55° F OFF SALES GAS COOLER
| Stream Number | | | | | | | Stored Oil Properties | | | | | | DUTY (MMBtu / h) | | | |
|---|---|---|---|---|---|---|---|---|---|---|---|---|---|---|---|---|
| 1 | 2 | 3 | 5 | 10 | 12 | 13 | TVP | RVP | BP | Q | T | P | Liquid Vol Flow | Water Bath Heater | Sales Gas Cooler | Total Duty | |
| Temp(°F) | bbl/d | Temp(°F) | bbl/d | Temp(°F) | Temp(°F) | bbl/d | psia | psi | °F | | °F | psia | bbl/d | MMbtu/h | MMbtu/h | MMbtu/h | RT |
| 125 | 266 | 55 | 163.9 | 102 | 112.33 | 100 | 70.51 | 15.2 | 10.27 | 100 | 0 | 100 | 15.2 | 2694 | 0.3 | -1.91 | -1.6100 | -134.167 |
| 130 | 289 | 55 | 187.6 | 104 | 112.33 | 100 | 70.59 | 15.2 | 10.28 | 100 | 0 | 100 | 00.0 | 2695 | 0.199 | -2.13 | -1.8840 | -157 |
| 135 | 314 | 55 | 212.6 | 106 | 112.34 | 100 | 71.09 | 15.2 | 10.3 | 100 | 0 | 100 | 00.0 | 2696 | 0.199 | -2.37 | -2.1710 | -180.917 |
| 140 | 339 | 55 | 238.8 | 108 | 112.38 | 100 | 72 | 15.2 | 10.31 | 100 | 0 | 100 | 00.0 | 2696 | 0.158 | -2.63 | -2.4720 | -206 |
| 145 | 366 | 55 | 266.2 | 109 | 112.42 | 100 | 73.22 | 15.2 | 10.33 | 100 | 0 | 100 | 00.0 | 2697 | 0.122 | -2.9 | -2.7780 | -231.5 |
| 150 | 393 | 55 | 294.8 | 111 | 112.52 | 100 | 74.84 | 15.2 | 10.35 | 100 | 0 | 100 | 00.0 | 2697 | 0.0937 | -3.18 | -3.0863 | -257.192 |
| 155 | 422 | 55 | 324.6 | 112 | 112.53 | 100 | 76.48 | 15.2 | 10.38 | 100 | 0 | 100 | 00.0 | 2697 | 0.0673 | -3.48 | -3.4127 | -284.392 |
| 160 | 452 | 55 | 355.4 | 112 | 112.59 | 100 | 78.45 | 15.2 | 10.4 | 100 | 0 | 100 | 00.0 | 2697 | 0.047 | -3.81 | -3.7630 | -313.583 |
| 165 | 483 | 55 | 387.4 | 113 | 112.64 | 100 | 80.56 | 15.2 | 10.42 | 100 | 0 | 100 | 00.0 | 2696 | 0.031 | -4.15 | -4.1190 | -343.25 |
| 170 | 514 | 55 | 420.3 | 114 | 112.69 | 100 | 82.82 | 15.2 | 10.44 | 100 | 0 | 100 | 00.0 | 2696 | 0.0195 | -4.52 | -4.5005 | -375.042 |
| 175 | 547 | 55 | 454.2 | 114 | 112.72 | 100 | 85.16 | 15.2 | 10.46 | 100 | 0 | 100 | 00.0 | 2695 | 0.0118 | -4.91 | -4.8882 | -408.183 |
| 180 | 581 | 55 | 489 | 114 | 112.74 | 100 | 87.58 | 15.2 | 10.47 | 100 | 0 | 100 | 00.0 | 2694 | 0.00805 | -5.33 | -5.3220 | -443.496 |
| 185 | 615 | 55 | 524.6 | 114 | 112.75 | 100 | 90.07 | 15.2 | 10.49 | 100 | 0 | 100 | 00.0 | 2693 | 0.00829 | -5.78 | -5.7717 | -480.978 |
| 190 | 650 | 55 | 560.9 | 114 | 112.75 | 100 | 92.6 | 15.2 | 10.5 | 100 | 0 | 100 | 00.0 | 2692 | 0.0125 | -6.26 | -6.2475 | -520.625 |
| 195 | 686 | 55 | 597.8 | 114 | 112.75 | 100 | 95.19 | 15.2 | 10.51 | 100 | 0 | 100 | 00.0 | 2691 | 0.0208 | -6.78 | -6.7592 | -563.267 |
| 200 | 722 | 55 | 635.2 | 113 | 112.75 | 100 | 97.83 | 15.2 | 10.52 | 100 | 0 | 100 | 00.0 | 2690 | 0.0335 | -7.34 | -7.3065 | -608.875 |
| 205 | 759 | 55 | 673 | 113 | 112.65 | 100 | 100.2 | 15.2 | 10.54 | 100 | 0 | 100 | 00.0 | 2689 | 0.0471 | -7.94 | -7.8929 | -657.742 |
| 210 | 795 | 55 | 711.1 | 112 | 112.58 | 100 | 102.7 | 15.2 | 10.55 | 100 | 0 | 100 | 00.0 | 2688 | 0.066 | -8.6 | -8.5340 | -711.167 |
| 215 | 832 | 55 | 749.2 | 111 | 112.49 | 100 | 105.2 | 15.2 | 10.55 | 100 | 0 | 100 | 00.0 | 2687 | 0.0887 | -9.32 | -9.2313 | -769.275 |
| 220 | 869 | 55 | 787.4 | 111 | 112.39 | 100 | 107.6 | 15.2 | 10.56 | 100 | 0 | 100 | 00.0 | 2686 | 0.115 | -10.1 | -9.9850 | -832.083 |
FIG. 11

NO RECOVERY COOLING OFF SALES GAS COOLER

| Stream Number | | | | | | | | Stored Oil Properties | | | | | | | DUTY (MMBtu/h) | | | |
|---|---|---|---|---|---|---|---|---|---|---|---|---|---|---|---|---|---|---|
| 1 | 2 | 3 | 5 | 10 | 12 | 13 | 13 | TVP | RVP | BP | Q | T | P | Liquid Vol Flow | Water Bath Heater | Sales Gas Cooler | Total Duty | |
| Temp(°F) | bbl/d | Temp(°F) | bbl/d | Temp(°F) | Temp(°F) | Temp(°F) | bbl/d | psia | psi | °F | | °F | psia | bbl/d | MMbtu/h | MMbtu/h | MMbtu/h | RT |
| 125 | 266 | 125 | 0 | 116 | 116 | 107 | 38.07 | 13.93 | 9.233 | 107.3 | 0 | 100 | 15.2 | 2519 | 0 | 0 | 0.0000 | 0 |
| 130 | 289 | 130 | 0 | 121 | 120.48 | 113.3 | 40.96 | 13.04 | 8.595 | 112.8 | 0 | 100 | 15.2 | 2478 | 0 | 0 | 0.0000 | 0 |
| 135 | 314 | 135 | 0 | 127 | 125.78 | 118 | 42.96 | 12.22 | 8.005 | 118.4 | 0 | 100 | 15.2 | 2439 | 0 | 0 | 0.0000 | 0 |
| 140 | 339 | 140 | 0 | 132 | 131.07 | 124 | 42.22 | 11.48 | 7.459 | 123.9 | 0 | 100 | 15.2 | 2398 | 0 | 0 | 0.0000 | 0 |
| 145 | 366 | 145 | 0 | 137 | 136.37 | 129 | 43.35 | 10.79 | 6.955 | 129.4 | 0 | 100 | 15.2 | 2359 | 0 | 0 | 0.0000 | 0 |
| 150 | 393 | 150 | 0 | 142 | 141.65 | 135 | 44.35 | 10.16 | 6.489 | 135 | 0 | 100 | 15.2 | 2319 | 0 | 0 | 0.0000 | 0 |
| 155 | 422 | 155 | 0 | 148 | 146.93 | 140 | 45.2 | 9.584 | 6.058 | 140.5 | 0 | 100 | 15.2 | 2280 | 0 | 0 | 0.0000 | 0 |
| 160 | 452 | 160 | 0 | 153 | 152.21 | 146 | 45.89 | 9.051 | 5.569 | 145.9 | 0 | 100 | 15.2 | 2241 | 0 | 0 | 0.0000 | 0 |
| 165 | 483 | 165 | 0 | 158 | 157.48 | 151 | 46.42 | 8.559 | 5.289 | 151.4 | 0 | 100 | 15.2 | 2202 | 0 | 0 | 0.0000 | 0 |
| 170 | 514 | 170 | 0 | 163 | 162.75 | 157 | 46.79 | 8.107 | 4.946 | 156.9 | 0 | 100 | 15.2 | 2162 | 0 | 0 | 0.0000 | 0 |
| 175 | 547 | 175 | 0 | 169 | 168.02 | 162 | 46.97 | 7.689 | 4.626 | 162.3 | 0 | 100 | 15.2 | 2123 | 0 | 0 | 0.0000 | 0 |
| 180 | 581 | 180 | 0 | 174 | 173.28 | 168 | 46.98 | 7.305 | 4.33 | 167.8 | 0 | 100 | 15.2 | 2083 | 0 | 0 | 0.0000 | 0 |
| 185 | 615 | 185 | 0 | 179 | 178.54 | 173 | 46.79 | 6.95 | 4.053 | 173.2 | 0 | 100 | 15.2 | 2044 | 0 | 0 | 0.0000 | 0 |
| 190 | 650 | 190 | 0 | 184 | 183.8 | 179 | 46.41 | 6.624 | 3.796 | 178.6 | 0 | 100 | 15.2 | 2004 | 0 | 0 | 0.0000 | 0 |
| 195 | 686 | 195 | 0 | 190 | 189.06 | 184 | 45.83 | 6.324 | 3.556 | 184.1 | 0 | 100 | 15.2 | 1965 | 0 | 0 | 0.0000 | 0 |
| 200 | 722 | 200 | 0 | 195 | 194.31 | 189 | 45.05 | 6.049 | 3.333 | 189.5 | 0 | 100 | 15.2 | 1925 | 0 | 0 | 0.0000 | 0 |
| 205 | 759 | 205 | 0 | 200 | 199.57 | 195 | 44.07 | 5.797 | 3.124 | 194.9 | 0 | 100 | 15.2 | 1886 | 0 | 0 | 0.0000 | 0 |
| 210 | 795 | 210 | 0 | 205 | 204.82 | 200 | 42.89 | 5.568 | 2.929 | 200.4 | 0 | 100 | 15.2 | 1846 | 0 | 0 | 0.0000 | 0 |
| 215 | 832 | 215 | 0 | 211 | 210.08 | 206 | 41.53 | 5.361 | 2.748 | 205.8 | 0 | 100 | 15.2 | 1808 | 0 | 0 | 0.0000 | 0 |
| 220 | 869 | 220 | 0 | 216 | 215.33 | 211 | 40 | 5.174 | 2.578 | 211.3 | 0 | 100 | 15.2 | 1769 | 0 | 0 | 0.0000 | 0 |

OIL RECOVERY SUMMARY

| Cost / bbl | 65 | USD | | | | | | | |
|---|---|---|---|---|---|---|---|---|---|
| Well Temperature | Total Oil Produced w / out WBH | Total Oil Produced w / WBH / SGC to 65° F | Additional Recovery w / WBH / SGC @ 65° F | | | Total Oil Produced w / WBH / SGC to 55° F | Additional Recovery w / WBH / SGC @ 55° F | | |
| (°F) | bbl / d | bbl / d | bbl / d | % | USD / day @ 65 per bbl | bbl / d | bbl / d | % | USD / day @ 65 per bbl |
| 125 | 2519 | 2668 | 149 | 5.9 | $9,685 | 2,694 | 175 | 6.9 | $11,375 |
| 130 | 2519 | 2668 | 149 | 5.9 | $9,685 | 2,694 | 175 | 6.9 | $11,375 |
| 135 | 2519 | 2668 | 149 | 5.9 | $9,685 | 2,694 | 175 | 6.9 | $11,375 |
| 140 | 2519 | 2668 | 149 | 5.9 | $9,685 | 2,694 | 175 | 6.9 | $11,375 |
| 145 | 2519 | 2668 | 149 | 5.9 | $9,685 | 2,694 | 175 | 6.9 | $11,375 |
| 150 | 2519 | 2668 | 149 | 5.9 | $9,685 | 2,694 | 175 | 6.9 | $11,375 |
| 155 | 2519 | 2668 | 149 | 5.9 | $9,685 | 2,694 | 175 | 6.9 | $11,375 |
| 160 | 2519 | 2668 | 149 | 5.9 | $9,685 | 2,694 | 175 | 6.9 | $11,375 |
| 165 | 2519 | 2668 | 149 | 5.9 | $9,685 | 2,694 | 175 | 6.9 | $11,375 |
| 170 | 2519 | 2668 | 149 | 5.9 | $9,685 | 2,694 | 175 | 6.9 | $11,375 |
| 175 | 2519 | 2668 | 149 | 5.9 | $9,685 | 2,694 | 175 | 6.9 | $11,375 |
| 180 | 2519 | 2668 | 149 | 5.9 | $9,685 | 2,694 | 175 | 6.9 | $11,375 |
| 185 | 2519 | 2668 | 149 | 5.9 | $9,685 | 2,694 | 175 | 6.9 | $11,375 |
| 190 | 2519 | 2668 | 149 | 5.9 | $9,685 | 2,694 | 175 | 6.9 | $11,375 |
| 195 | 2519 | 2668 | 149 | 5.9 | $9,685 | 2,694 | 175 | 6.9 | $11,375 |
| 200 | 2519 | 2668 | 149 | 5.9 | $9,685 | 2,694 | 175 | 6.9 | $11,375 |
| 205 | 2519 | 2668 | 149 | 5.9 | $9,685 | 2,694 | 175 | 6.9 | $11,375 |
| 210 | 2519 | 2668 | 149 | 5.9 | $9,685 | 2,694 | 175 | 6.9 | $11,375 |
| 215 | 2519 | 2668 | 149 | 5.9 | $9,685 | 2,694 | 175 | 6.9 | $11,375 |
| 220 | 2519 | 2668 | 149 | 5.9 | $9,685 | 2,694 | 175 | 6.9 | $11,375 |

FIG. 8

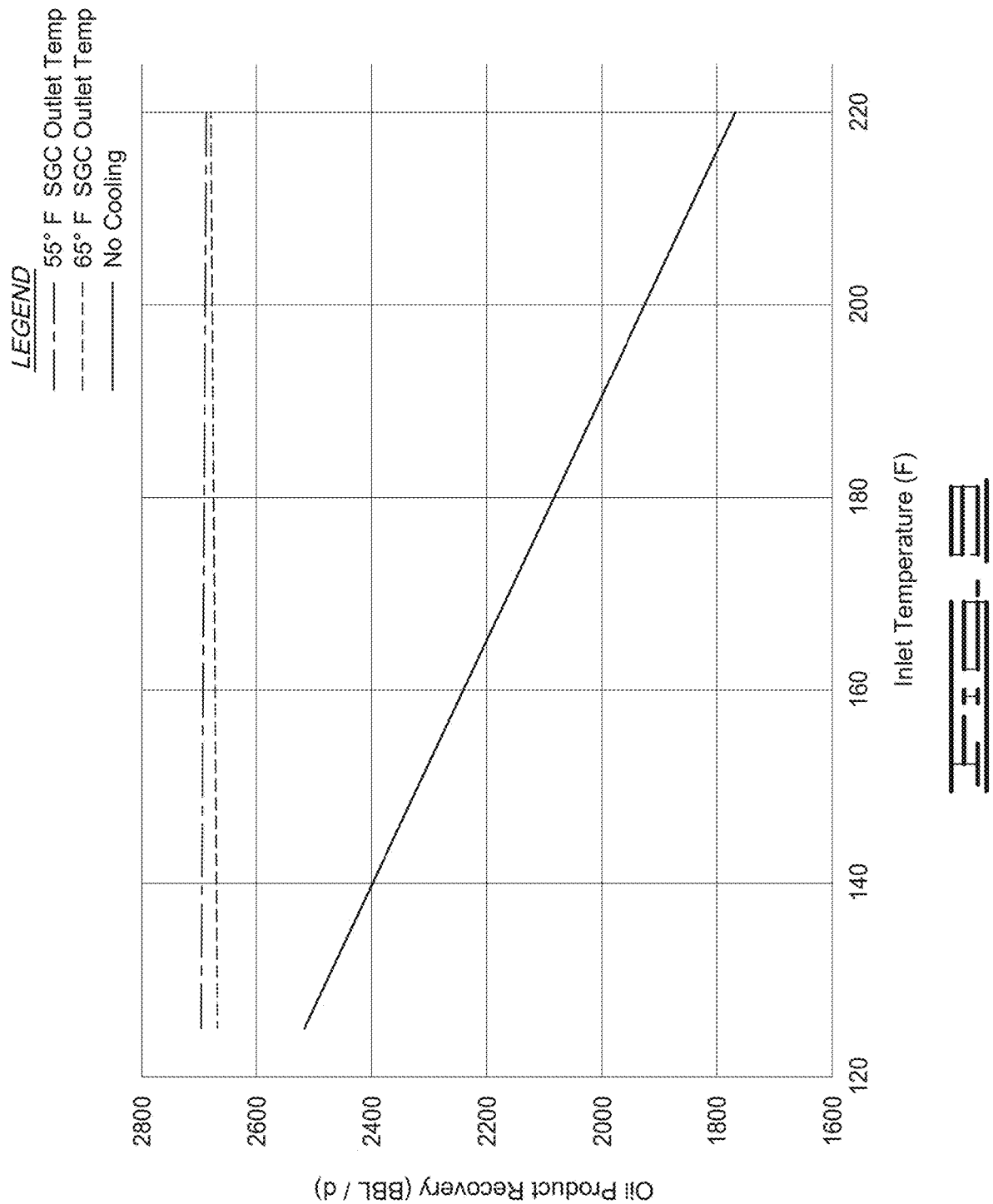

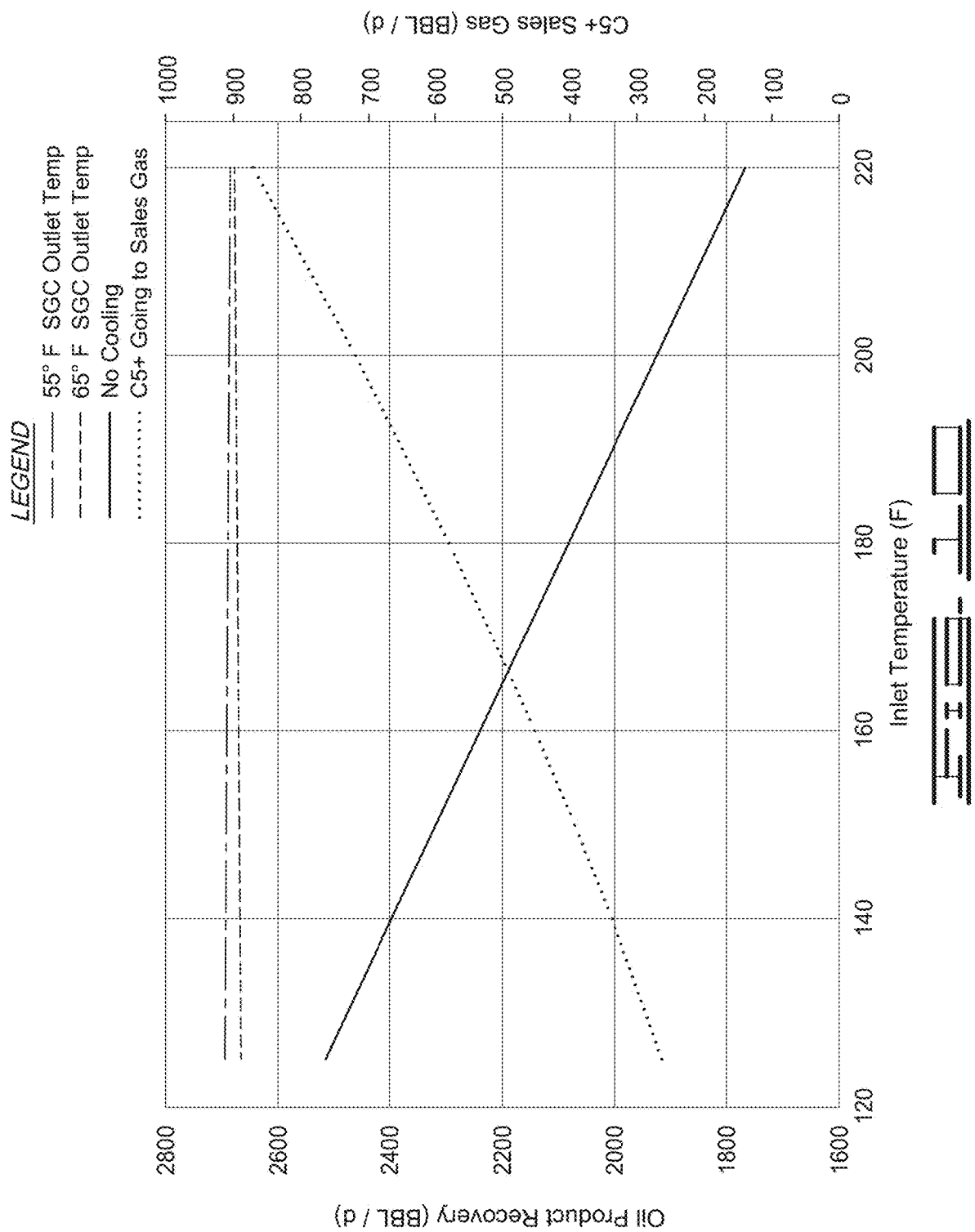

THREE-PHASE SEPARATION OF HYDROCARBON CONTAINING FLUIDS

CROSS-REFERENCE TO RELATED APPLICATIONS

This application claims the benefit of U.S. Provisional Application No. 62/852,704 filed May 24, 2019, which is hereby incorporated by reference.

FIELD

This disclosure relates to systems and methods for separation of hydrocarbon containing fluids. More particularly, the disclosure is relevant to separating fluids having a gas phase, a hydrocarbon liquid phase, and an aqueous liquid phase.

BACKGROUND

Most formations bearing hydrocarbons produce a crude oil which comprises simultaneously an oil phase, a gas phase and an aqueous phase, usually brine. Generally, these three phases are separated (the gas phase, the hydrocarbon liquid or oil, and the heavier aqueous liquid) so as to produce a product of liquid oil. Depending on the market and separation conditions, the gas phase may be produced as a product or burned as waste. Further, several wells can be tied together through a gathering line into a separation or processing plant.

Historically, the separation or processing plant could be just a simple tank, where initial gravity separation of water, oil and gas occurs. Theoretically, gas is taken from the top, water and sediments are drawn from the bottom, and the oil is drawn from the middle of the mixture. In practice, such separations have generally been more problematic. The success of the separation depends on the temperature and pressure of the crude oil produced from the well, which can vary, not only from well to well, but also over the life of the well. Additionally, the oil separated out as a product from the crude oil must meet vapor pressure specifications. Also, it has been increasingly important to eliminate waste, such as lighter liquid-phase hydrocarbons (typically four or five carbon atoms up to about 7 carbon atoms) that might be separated out with the gas-phase hydrocarbons (typically four carbon atoms or less carbon atoms). Unfortunately, when using conventional systems for separating the three phases, it can be difficult to address these concerns. Accordingly, new techniques for better separating the three phases are of interest in the industry.

SUMMARY OF THE INVENTION

As disclosed herein, systems and methods for separation of hydrocarbon containing fluids are provided. Such systems and methods work to provide a superior solution for separating a three-phase feed having a gas phase, an aqueous liquid phase, and a hydrocarbon-liquid phase. The gas phase typically comprises a gaseous light hydrocarbon. The aqueous liquid phase generally comprises water, saltwater or brine, such as produced water from oil production operations. The hydrocarbon liquid phase is typically composed of hydrocarbons that are in a liquid state at temperatures from about 32° F. to about 150° F. at standard pressure. While the invention has wider applicability, a typical area where it is useful is in separating gaseous hydrocarbons and aqueous liquid entrained in a hydrocarbon feed from a producing oil well.

For example, one embodiment is a process for separating a liquid hydrocarbon phase from a three-phase feed, wherein the process maintains a desirable Reid Vapor Pressure (RVP) for a produced hydrocarbon stream while limiting liquid-hydrocarbon phase and aqueous phase present in a produced gas.

The process comprising providing the three-phase feed at a first temperature and first pressure, wherein the first temperature is elevated temperature, defined as being at least 85° F., and the first pressure is elevated pressure, defined as being at least 50 psi. The three-phase feed has: (i) a gas phase defined as hydrocarbons and non-hydrocarbons that are gaseous at temperatures from about 32° F. to about 150° F. at standard pressure, (ii) a liquid-hydrocarbon phase defined as hydrocarbons that are in a liquid state at temperatures from about 32° F. to about 150° F. at standard pressure, and (iii) an aqueous phase defined as water, saltwater, brine or mixtures thereof.

The process further comprises separating the three-phase stream to produce a first gas stream and a first aqueous stream and a first hydrocarbon stream, wherein the first hydrocarbon stream is enriched in the liquid-hydrocarbon phase over the three-phase stream.

The first gas stream taken from the three-phase stream is separated so as to produce a liquid condensate and the produced gas. Prior to the separation of the first gas stream, the temperature of the first gas stream is reduced from elevated temperature to a first predetermined temperature, which is below elevated temperature. The first gas stream and produced gas remain at elevated pressure. The produced gas is enriched in gas phase over the three-phase feed and the first gas stream.

The process additionally comprises reducing pressure of the first hydrocarbon stream and liquid condensate so that the first hydrocarbon stream and liquid condensate are at a near atmospheric pressure. Adjusting the temperature of the first hydrocarbon stream and liquid condensate to be at a second predetermined temperature, which is elevated temperature.

After reducing pressure and adjusting temperature of the first hydrocarbon stream and liquid condensate, the first hydrocarbon stream and liquid condensate undergo separation to produce the produced hydrocarbon stream, which is enriched in the liquid-hydrocarbon phase and lower in gas phase and lower in aqueous phase than the first hydrocarbon stream and liquid condensate.

During the process, temperature and pressure for the three-phase stream, the gas stream, and the first hydrocarbon stream and liquid condensate are monitored. The process is adjusted based on the monitoring and changes to the temperature of the three-phase stream so as to maintain the first gas stream at the first predetermined temperature and the elevated pressure, and to maintain the first hydrocarbon stream and liquid condensate at near atmospheric pressure and at the second predetermined temperature after reducing pressure and adjusting temperature and prior to separation to produce the produced hydrocarbon stream, and thereby maintaining a desirable Reid Vapor Pressure (RVP) for the resulting produced hydrocarbon stream while limiting liquid-hydrocarbon phase and aqueous phase in the produced gas.

In some embodiments of this process, the separating of the three-phase stream occurs in a separator, and the liquid condensate is introduced to the separator so that the first hydrocarbon stream and the liquid condensate are both contained in an effluent stream removed from the separator.

In some embodiments of this process, the temperature of the three-phase stream is reduced from the first temperature prior to separation of the three-phase stream to thus partially reduce the temperature of the first gas stream from the first temperature toward the predetermined temperature.

In some embodiments of this process, the temperature of the first gas stream is reduced from the elevated temperature to the first predetermined temperature after the separation of the three-phase stream and before separation of the first gas stream.

As another example, another embodiment is a process comprising introducing a three phase feed, a first temperature, and first pressure into a first separation zone. The first temperature is elevated temperature, defined as being at least 85° F., and the first pressure is elevated pressure, defined as being at least 50 psig. The three-phase feed has: (i) a gas phase defined as hydrocarbons and non-hydrocarbons that are gaseous at temperatures from about 32° F. to about 150° F. at standard pressure, (ii) a liquid-hydrocarbon phase defined as hydrocarbons that are in a liquid state at temperatures from about 32° F. to about 150° F. at standard pressure, and (iii) an aqueous phase defined as water, saltwater, brine or mixtures thereof.

In the process, the three-phase stream is separated in the first separation zone to produce a first gas stream and a first aqueous stream and a first hydrocarbon stream, wherein the first hydrocarbon stream is enriched in the liquid-hydrocarbon phase over the three-phase stream.

The temperature of the first gas stream is reduced such that the first gas stream is at a second temperature. The second temperature being a first predetermined temperature that is below elevated temperature. Subsequently, the first gas stream is introduced into a second separation zone at the second temperature and elevated pressure, and separated in the second separation zone so as to produce a liquid condensate and a produced gas. The produced gas remains at elevated pressure, and the produced gas is enriched in gas phase over the three-phase feed and the first gas stream.

In the process, first temperature and the second temperature are monitored, and the reduction in temperature for the first gas stream is adjusted to maintain the first gas stream at the first predetermined temperature at introduction of the first gas stream into the second separation zone.

Also, in the process, the first hydrocarbon stream and liquid condensate are combined into a combined hydrocarbon stream. Subsequently, the pressure of the combined hydrocarbon stream is reduced so that the first hydrocarbon stream and liquid condensate are at a near atmospheric pressure. Also, after being combined, the temperature of the combined hydrocarbon stream is adjusted to be at a second predetermined temperature, which is elevated temperature.

Temperature for the combined hydrocarbon stream is monitored before and after reducing the pressure and adjusting the temperature of the combined hydrocarbon stream so as to maintain the temperature of the combined hydrocarbon stream at the second predetermined temperature.

After reducing pressure and adjusting temperature of the combined hydrocarbon stream, the combined hydrocarbon stream is introduced into a third separation zone, and separated in the third separation zone to produce a produced hydrocarbon stream. The produced hydrocarbon stream is enriched in the liquid-hydrocarbon phase, and lower in gas phase and lower in aqueous phase than the combined hydrocarbon stream.

In some embodiments of the above processes, the elevated pressure is defined as being at least 90 psig.

In the above processes, the first predetermined temperature can be within a predetermined set point range from 40° F. to 80° F., or within a predetermined set point range from 50° F. to 70° F.

In the above processes, the second predetermined temperature can be from about 90° F. to about 130° F.

Also, in the above processes, the produced gas stream can consist essentially of gas phase, and the liquid condensate can consist essentially of liquid-hydrocarbon phase and aqueous phase.

BRIEF DESCRIPTION OF THE DRAWINGS

FIG. 4 is a schematic diagram of the process and system of FIG. 3 at a temperature of 165° F.

FIG. 5 is a schematic diagram of the process and system of FIG. 3 at a temperature of 205° F.

FIG. 6 is a table showing the calculated results of running an embodiment of the current system and process for a variety of feed temperatures and with gas stream cooling to 55° F.

FIG. 8 is a table summarizing the oil recovery for the results of Example 1.

FIG. 9 is a graphical representation of the results shown in FIG. 8.

FIG. 10 is another graphical representation of the results shown in FIG. 8 including a calculation of hydrocarbon-liquid phase going to sales.

DESCRIPTION

Figure 1:
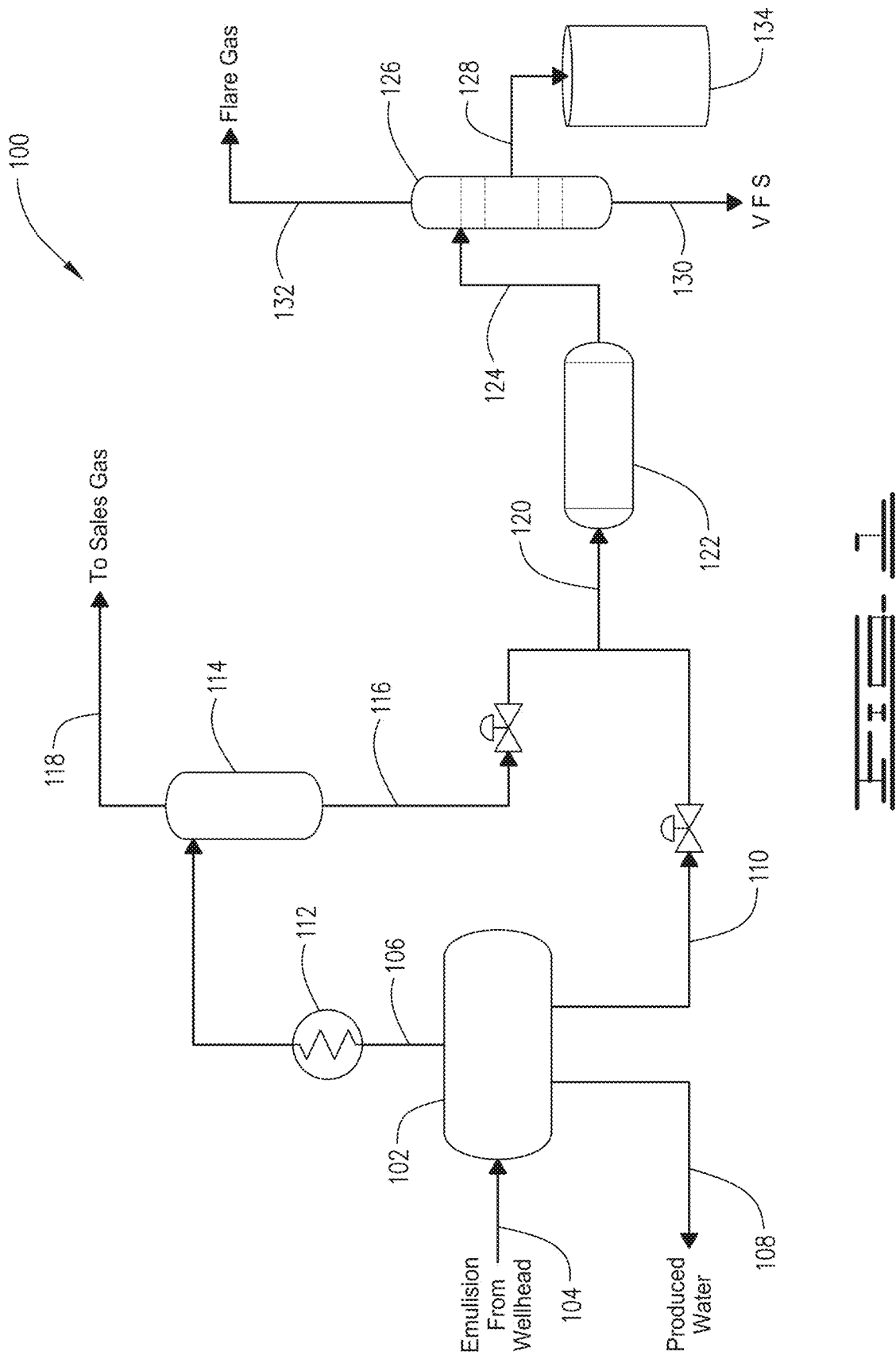
FIG. 1 is a schematic representation of a system in accordance with embodiments of this disclosure.

The present disclosure may be understood more readily by reference to the following description including the examples. In addition, numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described. Additionally, the description is not to be considered as limiting the scope of the embodiments described herein.

Referring now to the drawings, wherein like reference numbers are used herein to designate like elements throughout the various views, various embodiments are illustrated and described. The figures are not necessarily drawn to scale, and in some instances the drawings have been exaggerated and/or simplified in places for illustrative purposes only. Where components of relatively well-known designs are employed, their structure and operation will not be described in detail. One of ordinary skill in the art will appreciate the many possible applications and variations of the present invention based on the following description.

The following describes a system of equipment whose individual benefits work to provide a superior solution for separating a three-phase feed having a gas phase, an aqueous-liquid phase, and a hydrocarbon-liquid phase. The gas phase typically comprises a gaseous light hydrocarbon having less than five carbon atoms, or in some cases less than four carbon atoms, such as methane, ethane, propane, butane and the like. Generally, as used herein, gaseous light hydrocarbons are ones in a gaseous state at temperatures from about 32° F. to about 150° F. at standard pressure. The gas phase can also include non-hydrocarbons that are gaseous in the aforementioned temperature range, for example carbon dioxide and sulfur dioxide.

The aqueous-liquid phase generally comprises water, saltwater or brine, such as produced water from oil production operations. The hydrocarbon-liquid phase is typically composed of hydrocarbons that are in a liquid state at temperatures from about 32° F. to about 150° F. at standard pressure and generally is composed of hydrocarbons having five or more carbon atoms but may contain some hydrocarbons having four carbon atoms.

While the invention has wider applicability, a typical area where it is useful is in separating the gaseous phase and aqueous-liquid phase entrained in a hydrocarbon feed (three-phase feed) from a producing oil well. Depending on the process and three-phase feed conditions, the gas phase may be separated out along with significant amounts of the hydrocarbon-liquid phase that has flashed to the vapor phase. This is at least partially because when the three-phase feed is at elevated temperatures—generally 85° F. or greater, more typically 100° F. or greater, 110° F. or greater or 125° F. or greater—portions of the hydrocarbon-liquid phase will be in a gaseous state. For example, hydrocarbon-liquid phase components having four to eight, and more typically four to six, carbon atoms can be in a gaseous state and separated out with the gas phase.

Broadly, systems and methods of this disclosure can cool gas streams separated from the three-phase feed so as to recover portions of the hydrocarbon-liquid phase that have been separated out with the gaseous phase. Further, the systems and method can provide for heating or cooling of the stream containing hydrocarbon-liquid phase separated from the three-phase feed. The heating or cooling can be dynamic so that it is changed based on the requirements of the overall system or method, including conditions of the three-phase feed, such as the temperature and/or pressure of the three-phase feed.

Turning now to FIG. 1, the schematic representation of a system 100 to carry out the process is illustrated. System 100 is one embodiment of a system to carry out the process but is not limiting and other embodiments will be apparent from this disclosure. System 100 comprises a three-phase separator 102 which receives an incoming three-phase feed 104, for example a crude oil from an oil and gas well, which typically is an oil and water emulsion. Three-phase separators are separators wherein a feed comprising a gas phase and a lighter liquid and a heavier liquid phase are separated into the three phases: gas, lighter liquid and heavier liquid. Such a separator is also called a gas/liquid/liquid separator. Three-phase separators are used in the oil industry to separate mixtures of gas and oil, and water into the constituent gas phase, hydrocarbon-liquid phase and aqueous-liquid phase.

While FIG. 1 illustrates the system using one three-phase separator, some embodiments will instead use multiple separators. For example, the system could use a two-phase separator to separate off a portion of the gas phase. This two-phase separation can then be followed by a three phase separator to separate the off additional gas phase and to separate off at least a portion of the aqueous-liquid phase out of the stream, thus resulting in a stream enriched in the hydrocarbon-liquid phase. Alternatively, the three-phase separator could be followed by one or more two-phase separators, which further separate out the gas phase. In yet another example, the system could use a combination of two or more two-phase separators. Each two-phase separator is designed for either gas/liquid separation or liquid/liquid separation. Further, there can be multiple incoming three-phase feeds that enter parallel separators with the resulting enriched hydrocarbon-liquid phase streams combined downstream of the separators.

Generally, what is important is that the first three-phase separation—whether it is carried is one three-phase separator or a combination of two or more separators—is carried out at an elevated pressure. By "elevated pressure," it is meant that the pressure is above the mid-pressure, which is the pressure of the stream before final separation. Typically, the elevated pressure is a relatively high pressure, that is, at least 50 psig, at least 80 psig or at least 90 psig, depending on back pressure requirements. As used herein, the "mid-pressure" refers to a pressure less than the elevated pressure and higher than "near atmospheric." As used herein, "near atmospheric" means close to but typically more than surrounding atmospheric pressure. More specifically, "near atmospheric" is a pressure from about 0 psig to about 20 psig, more typically from about 1 psig to 20 psig, about 5 psig to about 15 psig or from about 7 psig to about 12 psig and often about 10 psig or less. For the current system and method the pressure of the product exiting the final separation 126 will be near atmospheric. In some embodiments, the mid-pressure can be close to the near atmospheric pressure, meaning that it is above the near atmospheric pressure—the pressure of the product exiting the final separation 126—but less than the elevated pressure. Typically, in such embodiments, the mid pressure will be within about 20 psi or even within about 10 psi of the near atmospheric pressure. For example, if the elevated pressure for an embodiment is 90 psig, and the near atmospheric pressure is 10 psig, the mid-pressure can broadly be above 10 psig but less than 90 psig; however, it would more typically be greater than 10 psig up to about 30 psig, or greater than 10 psig up to about 20 psig.

Typically, the three-phase feed stream 104 is at an elevated pressure, for example at least 50 psig, at least 80 psig or at least 90 psig. Further, the pressure of the enriched hydrocarbon-liquid exiting the first three-phase separation (represented by three-phase separator 102) maintains this elevated pressure though it often will be reduced from the pressure of the three-phase feed stream. However, embodiments hereunder encompass the pressure of the enriched hydrocarbon-liquid to be reduced to a pressure lower than 90 psig but still above the mid-pressure pressure.

Returning now to FIG. 1, the three-phase feed 104 is separated into a gas stream 106, an aqueous stream 108 and enriched hydrocarbon-liquid stream 110 in three-phase separator 102. As will be realized, gas stream 106 comprises the gas phase but may also include portions of the hydrocarbon-liquid phase, especially the lighter molecular weight portions, such as those having between four and six carbon atoms. While the gas stream 106 may have some minor portion of water, this is typically negligible at the pressure and temperatures of three-phase feed 104. The aqueous stream is comprised of the aqueous-liquid phase, and the enriched hydrocarbon-liquid phase is enriched in the hydrocarbon-liquid phase but may still contain some portion of the gas phase and the aqueous-liquid phase.

Gas stream 106 goes through a condenser or cooler 112—for example, a heat exchanger—where it may be cooled depending on the conditions of the gas stream, as further described below. From cooler 112, the gas stream goes to a separator 114 where liquid condensate 116 is separated from the gas stream. The liquid condensate 116 is comprised of the hydrocarbon-liquid phase, whereas the gas stream 118 coming out of separator 114 is primarily comprised of the gas phase. Gas stream 118 can be sold, flared as waste or used to help power system 100. Liquid condensate is introduced into enriched hydrocarbon-liquid stream 110 to produce a combined stream 120.

Either before or after they are combined, liquid condensate 116 and enriched hydrocarbon-liquid stream 110 are reduced in pressure. For example, they can be reduced to near atmospheric pressure. Typically, after the pressure is reduced, combined stream 120 is introduced into heating/cooling unit 122. In some embodiments, heating/cooling unit 122 will only be configured to cool or reduce the temperature of the combined stream. However, more typically, heating/cooling unit 122 is configured so that it can either heat or cool combined stream 120 depending on the process conditions, as further described below. In some embodiments, the pressure can be reduced downstream of heating/cooling unit 122, though typically this is less preferred. While any suitable heating/cooling device can be used, an indirect heat exchanger is especially suitable for the process.

As used herein "indirect heat exchanger" refers to a style of heating in which an intermediary bath liquid is heated or cooled to a predetermined temperature. For example, the bath liquid can be directly heated by the hot burner gases. Subsequently, the bath liquid is used to heat the treatment stream. For example, the treatment stream can flow through coils which are submerged in the bath liquid contained in a housing. When heating of the treatment fluid is needed, the bath liquid can be heated in place within the housing, such as by a fire tube channeling hot burner gases. For cooling, the bath liquid can be withdrawn from the housing, cooled and reintroduced into the housing such that the chilled bath liquid flows around the coils.

Stream 124 from heating/cooling unit 122 is introduced into separator 126, which can be a vertical flash separator, for example. If the stream did not undergo pressure reduction before heating/cooling unit 122, then the pressure of stream 124 is reduced prior to being introduced into separator 126. Within separator 126, a second portion of the aqueous-liquid phase 130 and a second portion of the gas phase 132 are separated from stream 124 to produce a second enriched hydrocarbon-liquid stream 128. The second portion of the aqueous-liquid phase 130 can be disposed of as waste. The second portion of the gas phase 132 can generally be sent to flare to burn as waste. The second enriched hydrocarbon-liquid stream 128 can be sent to a tank 134 for storage. Depending on the efficiency of separation upstream from separator 126, the amount of gas phase and/or aqueous liquid portion separated out at separator 126 can be minimal, negligible or even none.

The operation of systems in accordance with this disclosure allows for more efficient control over the recovery of hydrocarbons from feed streams. Both cooler 112 and heating/cooling unit 122 are dynamically controlled based on the conditions of the process and feed stream. Generally, three-phase feed streams entering separation system can be a broad range of temperatures generally up to about 250° F., but in some cases the feed stream may have a higher temperature. For example, a well at the start of production may produce crude oil at temperatures up near 210° F. Over time, the temperature can decrease down towards 85° F. Additionally, sometimes such separation systems are used to separate three-phase feeds that are produced from different wells; hence, are at different temperatures. Thus, it is not unusual for a separation system to have to deal with temperatures in the range from about 85° F. to 210° F.

Sales gas, such as gas stream 106, can include a portion of the hydrocarbon-liquid phase that has flashed in separator 102 into gas stream 106. The current system and method recovers this portion of the hydrocarbon-liquid phase as a liquid condensate by cooling in cooler 112 and separation in separator 114.

The cooling of gas stream 106 is controlled by monitoring the outlet temperature of cooler 112. If the outlet temperature falls below a predetermined set point, the flow of cooling fluid to cooler 112 is reduced or restricted so that gas stream 106 is not cooled as much. If the temperature rises above the predetermined set point, the flow of cooling fluid to cooler 112 is increased. The predetermined set point can be selected from a range of set point temperatures based on the type of crude oil coming from the well(s). The low end of the range is limited by the potential for formation of hydrates, the excess duty required to cool the water present in the vapor stream, and the recovery of light ends which would adversely affect the final Reid Vapor Pressure (RVP) of the stored crude oil. The upper end of the range is limited by crude oil loss. Generally, the predetermined set point can be selected from a range around 60° F. based on the well emulsion composition of the feed stream. For example, the set point can be selected from a range from 40° F. to 80° F., or from 50° F. to 70° F., and in some applications it will be about 65° F. or about 55° F. Further, the predetermined set point typically will need to be reassessed when the system is moved to a new wellsite or if significant changes in well emulsion composition occurs.

As will be realized from the above, an important aspect of the system is that gas stream 106 be at the set point temperature during separation in separator 114 so as to achieve a produced gas stream 118 that is low in liquid hydrocarbon phase and enriched in gas phase. Preferably, gas stream 118 consist essentially of gas phase and is essentially free of liquid hydrocarbon phase and/or aqueous phase, or even consists of gas phase. Accordingly, while FIG. 1 illustrates cooler 112 occurring between three phase separator 102 and separator 114, this placement of cooler 112 is not limiting, except that cooler 112 should be prior to separator 114, which produces produced gas stream 118.

Figure 2:
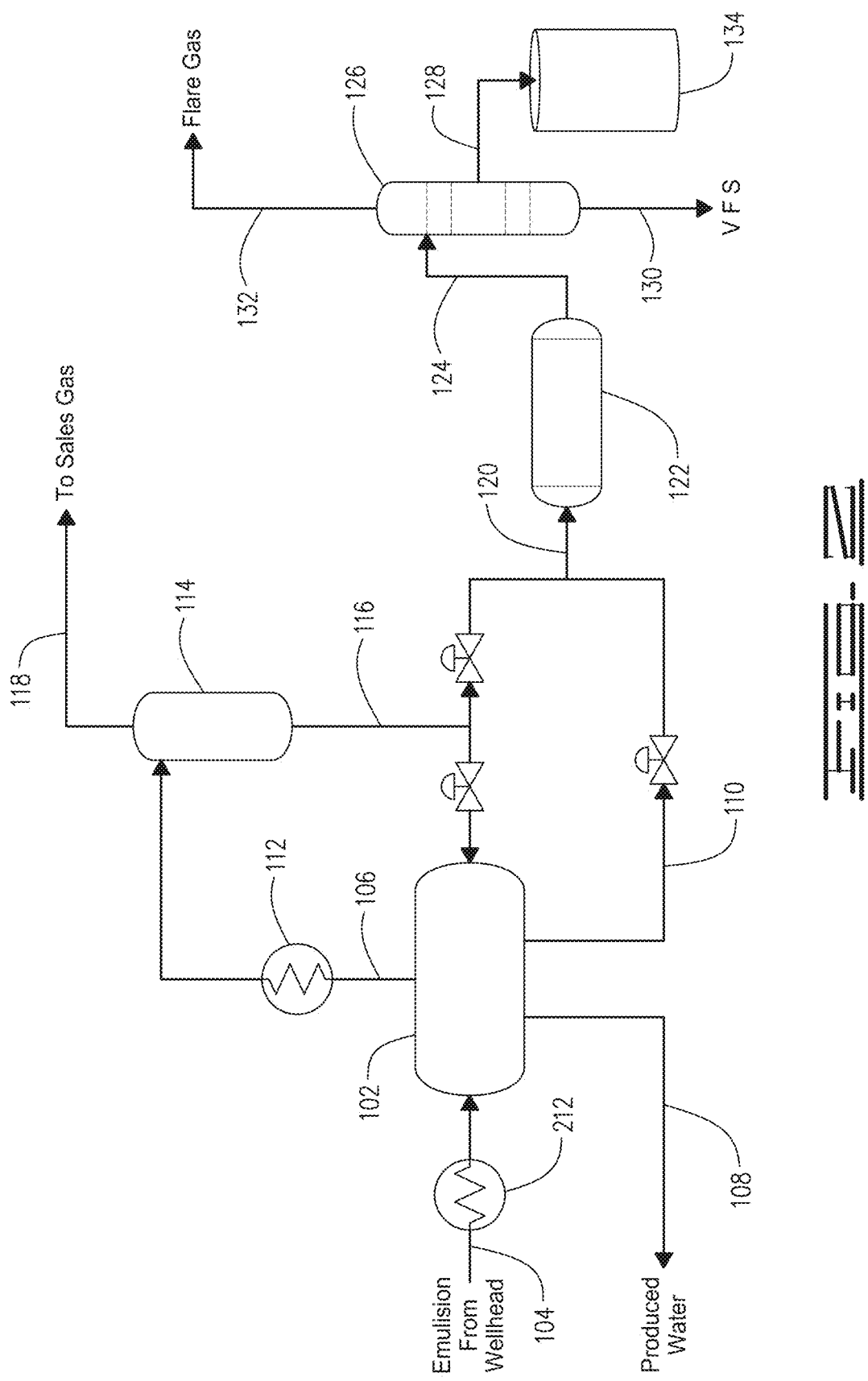
FIG. 2 is a schematic representation of another system in accordance with embodiments of this disclosure.

Thus, in the embodiment illustrated in FIG. 2, a cooler 212 (or condenser) occurs before the three-phase separator, and cools the three-phase stream at least part way to down from an elevated temperature to the set point temperatures. In some embodiments, cooler 212 will cool the three-phase stream substantially all the way to the set point temperature so that gas stream 106 leaves three-phase separator at the set point temperature and cooling in cooler 112 is not needed. In others (as illustrated in FIG. 2), both cooler 112 and 212 will be used to reduce the gas stream to the set point temperature.

Returning now to FIG. 1, the liquid condensate from separator 114 is sent back to the downstream side of three-phase separator 102 to be combined with enriched hydrocarbon-liquid stream 110. For example, the introduction of liquid condensate 116 into enriched hydrocarbon-liquid stream 110 can be after the reduction in pressure of enriched hydrocarbon-liquid stream 110, for example by a pressure let-down valve. However, other arrangements will be apparent based on this disclosure; for example, in any of the above embodiments, the liquid condensate 116 may be either joined with enriched hydrocarbon-liquid stream 110, as illustrated in FIG. 1, or may be returned to the three-phase separator and removed therefrom with the enriched hydrocarbon-liquid stream 110, as shown in FIG. 2.

Heating/cooling unit 122 receives the combined stream and is used to heat or cool the combined stream so that it is at predetermined temperature for the separation in separator 126, where the pressure is reduced to near atmospheric. The predetermined temperature is selected to reduce the amount of gas flashed in separator 126 by reducing the flashing to gas of the lighter molecular weight components of the hydrocarbon-liquid phase. Also, the predetermined temperature is selected to achieve the desired RVP for the product or crude stored in tank 134.

Heating/cooling unit 122 is a dual use piece of equipment. During periods when the three-phase feed (produced oil) temperature has declined below a selected temperature (for example, below about 125° F.) heating/cooling unit 122 is used to heat the oil to maintain the outlet stream temperature near the predetermined temperature prior to being allowed to flash, thus meeting the required RVP specification. During the period when the produced oil temperature is elevated above the selected temperature (for example, above about 125° F.), heating/cooling unit 122 is converted to a cooler, such as by cooling the bath medium through the use of a chiller to maintain the outlet oil temperature near the predetermined temperature. Sensors can be used to determine the temperature of the outlet stream and a controller can adjust the bath medium temperature to achieve the predetermined temperature of the outlet stream.

During periods where the well emulsion temperature is elevated above the selected temperature, the mixing of condensate with enriched hydrocarbon-liquid stream 110 cools the combined stream prior to entering heating/cooling unit 122. This allows heating/cooling unit 122 to provide the necessary cooling with less duty.

Heating/cooling unit 122 typically will be the final temperature control element in the stream in order to result in the necessary crude specification for storage. The cooling is controlled by monitoring crude oil outlet temperature of heating/cooling unit 122. If the outlet temperature falls below the predetermined temperature, the flow of cooling to the heating/cooling unit 122 is restricted. If the temperature rises above the predetermined temperature, the flow of cooling to heating/cooling unit 122 is increased. A range of predetermined temperatures may be used and are based on the mixture of the type of crude oil composition coming from the well(s) and the amount and temperature of the liquid condensate combined with the enriched hydrocarbon-liquid stream. The low end of the predetermined temperature range is limited by insufficient degassing of light ends in separator 126 which would adversely affect the final RVP of the crude oil stored in tank 134. The upper end of the predetermined temperature range is limited by a minor amount of crude oil loss. The optimal control point will generally be about 110° F. or about 112° F. but may be adjusted based on the emulsion composition of the three-phase feed and effluent composition from heating/cooling unit 122. Broadly, the predetermined temperature can be from about 90° F. to about 130° F. and more typically, from about 100° F. to about 120° F., or from about 110° F. to about 115° F. The predetermined temperature can be reassessed anytime the system is moved to a new wellsite or if significant changes in emulsion composition occur.

As production temperatures fall over well life, the requirement for cooling will diminish. When the temperature of the stream entering heating/cooling unit 122 falls below the predetermined temperature, cooling may be no longer be required. Then heating/cooling unit 122 can be switched from service as a cooler to service as a heater. This heating will provide a sufficient temperature to drive off any remaining gas phase in the stream in separator 126 and to maintain the temperature at the predetermined temperature so as to obtain the desired specification in the stored product.

Separator 126 is sized to allow both degassing of the gas phase from the hydrocarbon-liquid phase as well as any required liquid-liquid separation between the hydrocarbon liquid phase and aqueous-liquid phase entrained the stream from heating/cooling unit 122.

PROPHETIC EXAMPLES

In order to illustrate the benefits of a system in accordance with this disclosure, numerous calculated prophetic examples have been prepared. In each case, the calculations are for a three-phase feed. The calculations are for the hydrocarbon-liquid phase and gas-phase components of the hydrocarbon feed having the composition indicated in Table 1.

TABLE 1

| Mole Fraction | % | Mole Fraction | % |
| --- | --- | --- | --- |
| Oxygen | 0.000 | m-Xylene | 0.065 |
| $H_2S$ | 0.000 | p-Xylene | 0.403 |
| Carbon Dioxide | 2.520 | o-Xylene | 0.096 |
| Nitrogen | 0.133 | Heptane | 2.320 |
| Methane | 44.100 | Octane | 1.890 |
| Ethane | 13.000 | Nonane | 0.648 |
| Propane | 11.200 | Decane | 0.559 |
| i-C4 | 3.650 | Undecane | 0.335 |
| n-C4 | 10.300 | Dodecane | 0.343 |
| i-C5 | 0.577 | Tridecane | 0.394 |
| n-C5 | 1.050 | Tetradecane | 0.303 |
| 2-Methylpentane | 0.656 | Pentadecane | 0.351 |
| 3-Methylpentane | 0.262 | Hexadecane | 0.260 |
| n-Hexane | 0.932 | Heptadecane | 0.196 |
| 2,2,4-Trimethylpentane | 0.135 | Octadecane | 0.178 |
| Benzene | 0.135 | Nonadecane | 0.134 |
| Toluene | 0.628 | Eicosane | 2.200 |
| Ethylbenzene | 0.051 | Water | 0.000 |

The calculations use an aqueous liquid phase component of the three-phase feed having a standard liquid volumetric flow of 6000 bbl/d. For all the systems illustrated, it is assumed that the oil product needs to meet a Reid Vapor Pressure (RVP) of less than 10.842 psi and have a bubble point greater than or equal to 100° F.

Example 1

Figure 3:
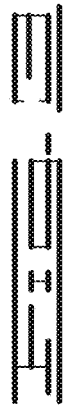
FIG. 3 is table showing the calculated results of running an embodiment of the current system and process for a variety of feed temperatures and with gas stream cooling to 65° F.

Results of utilizing the system and process of FIG. 1 for the above described feed are determined for a variety of feed temperatures from 125° F. to 220° F. with a gas stream cooler 112 cooling to a predetermined set point temperature of 65° F. The results are shown in table form in FIG. 3. For clarity, the process system diagram for the 165° F. feed temperature of table is shown in FIG. 4 and for the 205° F. feed temperature shown in FIG. 5. FIG. 8 is a table summarizing the oil recovery for the results of the Example 1.

Example 2

Results of utilizing the system and process of FIG. 1 for the above described feed are determined for a variety of feed temperatures from 125° F. to 220° F. with a gas stream cooler cooling to a predetermined set point temperature of 55° F. The results are shown in the table in FIG. 6.

Example 3

Figure 7:
FIG. 7 is a table showing the calculated results of running a system which does not use a gas stream cooler, recovery of hydrocarbon condensates from the gas stream, or a heating/cooling unit at a variety of feed temperatures.

Results of a system which does not use a gas stream cooler, recovery of hydrocarbon condensates from the gas stream, or a heating/cooling unit are determined for a variety of feed temperatures from 125° F. to 220° F. The results are shown in the table of FIG. 7.

These results of the above Examples are illustrated graphically in FIGS. 9 and 10. As can be seen from FIG. 9, as the inlet temperature increases the oil product recovery goes down for the system of Example 3; however, current processes and systems (as represented by Examples 1 and 2) maintain a steady oil product recovery. Further, as reflected by FIG. 10, the amount of liquid hydrocarbon phase (C5+) being removed with the gas phase increases for the system of Example 3 but this is avoided for the systems of Examples 1 and 2.

While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Additionally, where the term "about" is used in relation to a range it generally means plus or minus half the last significant figure of the range value, unless context indicates another definition of "about" applies.

Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A process for separating a liquid hydrocarbon phase from a three-phase feed, the process comprising:
    providing the three-phase feed at a first temperature and a first pressure, wherein the first temperature is an elevated temperature, defined as being at least 85° F., and the first pressure is an elevated pressure, defined as being at least 50 psig, and wherein the three-phase feed has:
        (i) a gas phase defined as hydrocarbons and non-hydrocarbons that are gaseous at temperatures from about 32° F. to about 150° F. at standard pressure,
        (ii) a liquid-hydrocarbon phase defined as hydrocarbons that are in a liquid state at temperatures from about 32° F. to about 150° F. at standard pressure, and
        (iii) an aqueous phase defined as water, saltwater, brine or mixtures thereof;
    separating the three-phase feed to produce a first gas stream and a first aqueous stream and a first hydrocarbon stream, wherein the first hydrocarbon stream is enriched in the liquid-hydrocarbon phase over the three-phase feed;
    separating the first gas stream so as to produce a liquid condensate and a produced gas, wherein prior to the of separating the first gas stream, the temperature of the first gas stream is reduced from the first temperature to a first predetermined temperature, which is below the first temperature, wherein the first gas stream is maintained at an elevated pressure prior to the separating of the first gas stream, and the produced gas is produced from the separating at an elevated pressure, and wherein the produced gas is enriched in the gas phase over the three-phase feed and the first gas stream;
    combining the first hydrocarbon stream and the liquid hydrocarbon stream to form a combined hydrocarbon stream;
    reducing the respective pressures of the first hydrocarbon stream and the liquid condensate, either before or after forming the combined hydrocarbon stream, so that the combined hydrocarbon stream is at a near atmospheric pressure;
    adjusting the temperature of the first hydrocarbon stream and the liquid condensate, either before or after forming the combined hydrocarbon stream, so that the combined hydrocarbon stream is at a second predetermined temperature, wherein the second predetermined temperature is an elevated temperature;
    after the reducing of the respective pressures and the adjusting of the temperature of the first hydrocarbon stream and the liquid condensate, separating the combined hydrocarbon stream, which is at the near atmospheric pressure and the second predetermined temperature, to produce a produced hydrocarbon stream, which is enriched in the liquid-hydrocarbon phase and lower in the gas phase and lower in the aqueous phase than the first hydrocarbon stream and the liquid condensate;
    monitoring the temperature and the pressure of the three-phase feed, the first gas stream, and the first hydrocarbon stream and the liquid condensate; and
    adjusting the process based on the monitoring and changes to the temperature of the three-phase feed so as:
        to maintain the first gas stream at the first predetermined temperature and an elevated pressure prior to the separating of the first gas stream, and
        to maintain the combined hydrocarbon stream at the near atmospheric pressure and at the second predetermined temperature after the reducing of the respective pressures and the adjusting of the temperature of the first hydrocarbon stream and the liquid condensate, and prior to the separating of the combined hydrocarbon stream to produce the produced hydrocarbon stream.

2. The process of claim 1, wherein the first pressure is at least 90 psig.

3. The process of claim 1, wherein the first predetermined temperature is within a predetermined set point range from 40° F. to 80° F.

4. The process of claim 1, wherein the first predetermined temperature is within a predetermined set point range from 50° F. to 70° F.

5. The process of claim 1, wherein the second predetermined temperature is from about 90° F. to about 130° F.

6. The process of claim 1, wherein the produced gas stream consists essentially of the gas phase, and the liquid condensate consists essentially of the liquid-hydrocarbon phase and the aqueous phase.

7. The process of claim 1, wherein the temperature of the first gas stream is reduced to the first predetermined temperature after the separation of the three-phase feed and before separation of the first gas stream.

8. The process of claim 7, wherein the first pressure is at least 90 psig, the first predetermined temperature is within a predetermined set point range from 50° F. to 70° F., and the second predetermined temperature is from about 90° F. to about 130° F.

9. The process of claim 8, wherein the produced gas stream consists essentially of the gas phase, and the liquid condensate consists essentially of the liquid- hydrocarbon phase and the aqueous phase.

10. A process comprising:
   introducing a three-phase feed at a first temperature and a first pressure into a first separation zone, wherein the first temperature is an elevated temperature, defined as being at least 85° F., and the first pressure is an elevated pressure, defined as being at least 50 psig, and wherein the three-phase feed has:
      (i) a gas phase defined as hydrocarbons and non-hydrocarbons that are gaseous at temperatures from about 32° F. to about 150° F. at standard pressure,
      (ii) a liquid-hydrocarbon phase defined as hydrocarbons that are in a liquid state at temperatures from about 32° F. to about 150° F. at standard pressure, and
      (iii) an aqueous phase defined as water, saltwater, brine or mixtures thereof;
   separating the three-phase feed in the first separation zone to produce a first gas stream and a first aqueous stream and a first hydrocarbon stream, wherein the first hydrocarbon stream is enriched in the liquid-hydrocarbon phase over the three-phase feed;
   reducing the temperature of the first gas stream such that the first gas stream is at a second temperature, the second temperature being below the first temperature;
   introducing the first gas stream into a second separation zone at the second temperature and an elevated pressure;
   separating the first gas stream in the second separation zone so as to produce a liquid condensate and a produced gas; wherein the produced gas is produced during the separating at an elevated pressure, and wherein the produced gas is enriched in the gas phase over the three-phase feed and the first gas stream;
   monitoring the first temperature and the second temperature;
   adjusting the process based on the monitoring to maintain the first gas stream at the second temperature at the introduction of the first gas stream into the second separation zone;
   combining the first hydrocarbon stream and the liquid condensate into a combined hydrocarbon stream;
   reducing the pressure of the combined hydrocarbon stream to a near atmospheric pressure; adjusting the temperature of the combined hydrocarbon stream to be at a third temperature, which is an elevated temperature;
   monitoring the temperature for the combined hydrocarbon stream before and after reducing the pressure and adjusting the temperature of the combined hydrocarbon stream so as to maintain the temperature of the combined hydrocarbon stream at the third temperature;
   after reducing the pressure and adjusting the temperature of the combined hydrocarbon stream, introducing the combined hydrocarbon stream into a third separation zone; and
   separating the combined hydrocarbon stream in the third separation zone to produce a produced hydrocarbon stream, which is enriched in the liquid-hydrocarbon phase and lower in the gas phase and lower in the aqueous phase than the combined hydrocarbon stream.

11. The process of claim 10, wherein the first pressure is at least 90 psig.

12. The process of claim 10, wherein the second temperature is within a predetermined set point range from 40° F. to 80° F.

13. The process of claim 10, wherein the second temperature is within a predetermined set point range from 50° F. to 70° F.

14. The process of claim 10, wherein the third temperature is from about 90° F. to about 130° F.

15. The process of claim 10, wherein the produced gas stream consists essentially of the gas phase, and the liquid condensate consists essentially of the liquid-hydrocarbon phase and the aqueous phase.

16. The process of claim 15, wherein the first pressure is at least 90 psig, the second temperature is within a predetermined set point range from 50° F. to 70° F., and the third temperature is from about 90° F. to about 130° F.

* * * * *